(12) United States Patent
Pasaribu et al.

(10) Patent No.: US 10,774,923 B2
(45) Date of Patent: Sep. 15, 2020

(54) GEAR-DRIVEN BEARING UNIT

(71) Applicant: Aktiebolaget SKF, Gothenburg (SE)

(72) Inventors: Rihard Pasaribu, Nieuwegein (NL); Nicolaas Simon Willem Den Haak, Zwijndrecht (NL); Koos Welling, Utrecht (NL); Christian Kogler, Oberkurzheim (AT)

(73) Assignee: AKTIEBOLAGET SKF, Gothenburg (SE)

( * ) Notice: Subject to any disclaimer, the term of this patent is extended or adjusted under 35 U.S.C. 154(b) by 1205 days.

(21) Appl. No.: 14/373,614

(22) PCT Filed: Jan. 21, 2013

(86) PCT No.: PCT/EP2013/000170
§ 371 (c)(1),
(2) Date: Jul. 21, 2014

(87) PCT Pub. No.: WO2013/107654
PCT Pub. Date: Jul. 25, 2013

(65) Prior Publication Data
US 2015/0211624 A1 Jul. 30, 2015

(30) Foreign Application Priority Data
Jan. 20, 2012 (WO) ............. PCT/EP2012/050861

(51) Int. Cl.
*F16H 1/16* (2006.01)
*F16H 55/06* (2006.01)
(Continued)

(52) U.S. Cl.
CPC ....... *F16H 57/0464* (2013.01); *F16C 19/185* (2013.01); *F16C 33/581* (2013.01);
(Continued)

(58) Field of Classification Search
CPC .............................. F16H 57/0464; F16H 1/16
See application file for complete search history.

(56) References Cited

U.S. PATENT DOCUMENTS

| 4,505,484 A | * | 3/1985 | Ohkuma | F16C 33/782 |
|---|---|---|---|---|
| | | | | 277/348 |
| 5,957,000 A | | 9/1999 | Pecorari | |

(Continued)

FOREIGN PATENT DOCUMENTS

| DE | 102007042770 A1 | 3/2009 |
|---|---|---|
| DE | 102009006955 A1 | 8/2010 |

(Continued)

*Primary Examiner* — Terence Boes
(74) *Attorney, Agent, or Firm* — Bryan Peckjian; SKF USA Inc. Patent Dept.

(57) ABSTRACT

A gear-driven bearing unit comprising a housing, a drive gear and a rolling element bearing The rolling element bearing comprising: an outer member with teeth for meshing with drive gear teeth, an inner member and rolling elements between the inner and outer members. At one axial side, the housing is connected to the inner member enclosing the outer member. A first radial gap extends between an outer member radially inner surface and an inner member radially outer surface. A second radial gap exists between an outer member radially outer surface and a housing radially inner surface. The radial gaps are sealed by seals, each comprising radial sealing lips. The unit is lubricated with a grease comprising a calcium-based thickener or calcium salt additives and the teeth on the outer member are made of a hardening treated bearing-grade steel which diffuses nitrogen into the surface of the teeth.

11 Claims, 5 Drawing Sheets

(51) Int. Cl.
  *F16H 57/029*   (2012.01)
  *F16H 57/04*    (2010.01)
  *F16C 33/78*    (2006.01)
  *F16C 33/58*    (2006.01)
  *F16C 33/66*    (2006.01)
  *F16C 41/00*    (2006.01)
  *F16C 19/18*    (2006.01)

(52) U.S. Cl.
  CPC .......... *F16C 33/6633* (2013.01); *F16C 33/78* (2013.01); *F16C 41/00* (2013.01); *F16H 1/16* (2013.01); *F16H 55/06* (2013.01); *F16H 57/029* (2013.01); *F16H 57/0471* (2013.01); *F16H 57/0498* (2013.01); *F16C 2300/14* (2013.01); *F16C 2361/61* (2013.01); *Y10T 74/1966* (2015.01)

(56) References Cited

U.S. PATENT DOCUMENTS

| | | | | |
|---|---|---|---|---|
| 8,459,872 | B2* | 6/2013 | Nies | F03D 11/0008 384/126 |
| 2003/0020214 | A1* | 1/2003 | Poor | C23C 8/22 266/252 |
| 2003/0176298 | A1* | 9/2003 | Nakatani | C10M 123/06 508/398 |
| 2004/0079315 | A1* | 4/2004 | Hamilton | F02B 67/06 123/192.2 |
| 2004/0244521 | A1 | 12/2004 | Russ | |
| 2015/0225835 | A1* | 8/2015 | Larsson | C23C 8/80 148/219 |

FOREIGN PATENT DOCUMENTS

EP   1452755 A1   9/2004
WO   2010043249 A1   4/2010

\* cited by examiner

GEAR-DRIVEN BEARING UNIT

CROSS REFERENCE TO RELATED APPLICATION

This is a National Stage application claiming the benefit of International Application Number PCT/EP2013/000170 filed on 21 Jan. 2013 (21, Jan. 2013), which claims the benefit of International Application Number PCT/EP2012/050861 filed on 20 Jan. 2012 (20, Jan. 2012), both of which are incorporated herein by reference in their entireties.

FIELD OF THE INVENTION

The present invention relates to a gear-driven bearing unit for rotatably supporting slewing loads.

BACKGROUND

An example of a gear-driven bearing unit of this kind is disclosed in US 2004/0244521. The unit comprises a toothed connection element and an untoothed connection element, between which one or more rows of rolling elements are arranged. The unit further comprises a housing and worm gear or a spur gear for driving the toothed connection element. Part of the housing is connected to the untoothed connection element and axially encloses the toothed connection element at one side. A further part of the housing radially encloses the toothed connection element. The unit is lubricated with grease and comprises sealing rings for sealing a gap between the housing and the toothed connection element and a further gap between the toothed connection element and the untoothed connection element. The sealing rings are designed to allow grease to escape via the sealing rings when the unit is filled with new grease.

The unit disclosed in the above-mentioned US application is therefore designed to facilitate relubrication. The prescribed relubrication interval for commercially available gear-driven bearing units typically lies in the order of several months. The refilling of a unit with fresh grease is a time-intensive procedure, leading to high maintenance costs, especially when many such units are located at a site.

Consequently, there is room for improvement.

DISCLOSURE OF THE INVENTION

It is an object of the present invention to define a gear-driven bearing unit, which does not require relubrication and which is maintenance free for the duration of its life. This is achieved according to the invention in two main ways:

Firstly, the unit is provided with improved sealing, such that there is practically no leakage of a grease lubricant provided within the unit.

Secondly, the grease lubricant has a composition which, in combination with material properties of contacting surfaces of the unit, enable low-friction and wear-free operation during the service life of the unit.

Specifically, the invention resides in a gear-driven bearing unit comprising a housing, a drive gear and a rolling element bearing, the rolling element bearing comprising: an outer member provided with teeth for meshing with teeth of the drive gear, an inner member and at least one row of rolling elements disposed between the inner and outer members. At one axial side of the unit, there is a first radial gap between a radially inner surface of the outer member and a radially outer surface of the inner member. Further, a second radial gap exists between a radially outer surface of the outer member and a radially inner surface of the housing. The unit is at least partly filled with a grease lubricant, which is retained within the unit by a first seal provided in the first radial gap and by a second seal provided in the second radial gap. According to the invention, at least one, and preferably both, of the first and second seals comprises first and second radial sealing lips that bear against an opposing radially oriented counterface. Furthermore, the grease lubricant comprises a calcium-based thickener or comprises calcium salt additives and the gear teeth on the outer member are made of a bearing-grade steel that has been subjected to a hardening treatment that diffuses nitrogen into the gear teeth surface.

The gear-driven bearing unit has bearing surfaces which experience rolling contact and gear surfaces which experience sliding contact. The unit is typically designed for slow rotation speeds (<0.1 rpm), meaning that wear is likely to be the cause of system failure rather than fatigue. In the gear surfaces, sliding wear is expected to be the main failure mechanism and in the bearing surfaces, fretting wear is expected to be the main failure mechanism. In a unit according to the invention, both the bearing surfaces and gear surfaces are protected from wear by a reaction layer that forms on these surfaces. The reaction layer comprises calcium from the grease, which is thought to initiate the reaction. The reaction layer forms a durable separation layer that protects the contacting surfaces in the unit.

The reaction layer also provides low friction between the contacts, and the present inventors have found that a particularly low friction can be achieved in the sliding contacts of the gear when the teeth of the outer member are nitrided, or are subjected to another treatment that diffuses nitrogen into the surface of the teeth. Ferritic nitrocarburizing is another example of a suitable treatment. In addition, friction in the gear contacts can be further reduced when the teeth of the drive gear, typically a worm gear, are made of hardened bearing steel. In an advantageous embodiment, the teeth of the drive gear are also subjected to a treatment that diffuses nitrogen into the surface of the teeth.

In combination with the improved sealing, a gear driven bearing unit is provided, which is practically maintenance-free.

In each seal used in the unit of the invention, the first and second lips are axially spaced, whereby the first lip is defined as lying closer to a radial centreline of the unit than the second lip. The first lip with therefore be referred to as the inner lip and the second lip will be referred to as the outer lip. The outer lip is exposed to the outside environment, meaning that the inner seal lip is shielded from the outside environment. As a result, the inner lip is not exposed to e.g. the ageing effects of sunlight and can retain optimal sealing function for a long period. A further advantage of a dual-lip seal is that the seal can be optimised for dual functionality. Specifically, the outer lip may be adapted to exclude moisture and particulate contaminates from entering the unit, while the inner seal lip is adapted to retain lubricant within the unit.

A preferred grease lubricant comprises a complex calcium sulphonate thickener. Examples of such greases are the SKF greases "LGHB 2" and "LGWM 2". It is also possible to use a lithium-based grease that comprises e.g. calcium hydroxide additives, such as "LGAF 3E" from SKF.

Grease may also be provided between the outer and inner lips of each seal. The grease may be the same type of grease that lubricates the gear and bearing, or may be a different grease that is specifically selected to lubricate the sealing contact and minimise lip wear. An additional advantage of providing grease between the seal lips is that the grease itself acts as a sealant. Leakage and contaminant ingress are therefore further reduced and the relubrication interval further extended.

In an advantageous further development of the invention, the inner lip of each seal extends towards the opposing counterface in a direction towards the radial centreline of the unit, while the outer lip extends towards the counterface in the opposite direction. In other words, the inner lip is inwardly angled towards the radial centreline and the outer seal lip is outwardly angled away from the radial centreline. The advantage of this development is that each lip is pressed against the counterface under the prevailing pressure conditions, thereby enhancing the seal's dual functionality. Inside the unit, a pressure build-up tends to take place. When this pressure acts on the inwardly angled inner lip, the lip is pressed towards the counterface, which enhances its ability to prevent leakage of lubricant. At the outside of the unit, pressure acting on the outwardly angled outer lip urges this lip towards the counterface, which enhances the outer lip's ability to prevent the entry of contaminants. Grease life is therefore prolonged In a still further development, each seal is adapted to contribute to temperature control inside the unit. A long relubrication interval is achieved not only by preventing leakage, but also by ensuring that the grease lubricant remains in a good condition for a long period of time. Grease life can be prolonged by keeping the grease temperature as low as possible. Therefore, in one example, at least the outer surface of the outer lip is thermally reflective. For example, the outer surface may be provided with a thermally reflective coating or my simply have a colour such as white or silver that is relatively poor at absorbing heat. When the unit according to the invention is used outdoors, e.g. to support an array of solar panels, the seal therefore helps to prevent the sun's rays from increasing the temperature inside the unit. In a further example, the outer surface of the outer lip is non smooth. This increases the surface area of the seal, relative to a smooth surface, which facilitates heat transfer towards the outside environment.

In a still further development, the housing of the unit is similarly adapted to prevent temperature rises inside the unit and/or to facilitate heat transfer to the environment.

In addition to first and second lips, each seal used in the inventive unit has an attachment part. Suitably, the attachment part is integrally formed with the rest of the seal, so that the seal may be manufactured simply by means of a moulding operation. The seal is therefore preferably made from an elastomeric material such as synthetic rubber or elastomeric polyurethane.

In a preferred embodiment, each seal is essentially symmetrical about a radial centreline, whereby the inner and outer lips extend from a central portion of the attachment part.

In one example, the attachment part is ring-shaped and fits into a groove provided in a cylindrical surface opposite from the counterface.

In a further example, the attachment part has a U-shaped cross-section. Accordingly, a protrusion is provided on the surface radially opposite from the counterface, whereby arms of the U-shaped part surround the protrusion. In an advantageous embodiment, a projection is provided on the radially inner surface of the housing. This allows less material to be used for the housing and also creates a small amount of additional space for auxiliary components.

In one embodiment of the invention, a first counterface for one seal is provided on an inner cylindrical surface of the outer member and a second counterface for the other seal is provided on an outer cylindrical surface of the outer member. Alternatively, the first counterface may be provided on an outer cylindrical surface of the inner member. The aforementioned surfaces form part of larger tribological surfaces (gear contact surfaces and rolling contact surfaces), which are smooth and hard. These surfaces are extremely suitable as a counterface for radial lips and cause minimal lip wear.

In many applications, the unit is mounted such that the axial side at which the seals are provided faces downwards, i.e. rotation side down. Even in such applications, the double lips of the seals prevent leakage, meaning that relubrication will not be required for many years. The relubrication interval can be as long as 20 years, such that a unit according to the invention is effectively greased for life. As will be understood, this is not only beneficial in terms of reducing maintenance costs, but also greatly reduces the grease requirement and the financial and environmental impact thereof.

In a preferred embodiment of the invention, the teeth that engage with the drive gear are machined directly into a radially outer side of the outer member and the radially inner side of the outer member is provided with one or more raceways for one or more rows of rolling elements. As mentioned, the teeth on the outer member are subjected to e.g. a hard nitriding treatment or a ferritic nitrocarbonizing treatment. Machining then occurs, after which the one or more raceways are formed by means of induction hardening.

A toothed bearing outer ring provides optimal radial compactness, but, as will be understood, the unit may comprise a ring gear that is mounted to a separate bearing outer ring. The ring gear is then made from a bearing-grade steel, whereby the surfaces of the teeth are diffused with nitrogen.

The rolling element bearing incorporated within the unit may be a slewing bearing or a 4-point contact bearing. Preferably, the unit comprises a double-row angular contact bearing. Accordingly, the outer member is provided with two angular raceways and the inner member is formed by two appropriate inner rings that are connected together. The advantage of a double-row angular contact bearing is that is has excellent capacity for axial loads and tilting moments. Furthermore, bearing preload can be accurately controlled to ensure high stiffness with zero play.

As demonstrated, a gear-driven bearing unit according to the invention has several advantages. Other benefits will be come clear from the following detailed description and accompanying drawings.

BRIEF DESCRIPTION OF THE DRAWINGS

FIG. 5a, 5b, 5c are plots of friction test results from hardened bearing steel in fretting contact with hardened bearing steel, lubricated by:

Figure 5A:
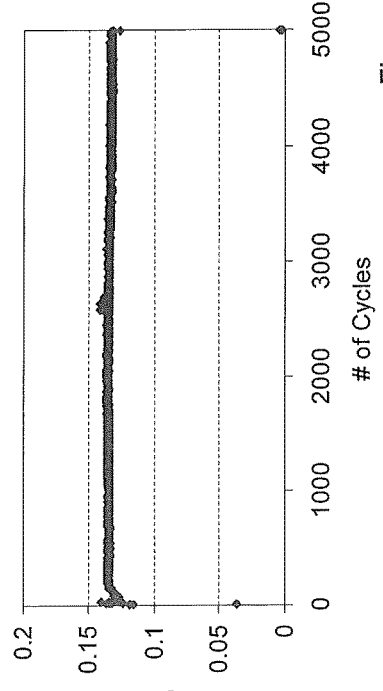

Grease A (FIG. 5*a*);
Grease C (FIG. 5*b*); and
Grease B and Grease D (FIG. 5*c*).

DETAILED DESCRIPTION

Figure 1:
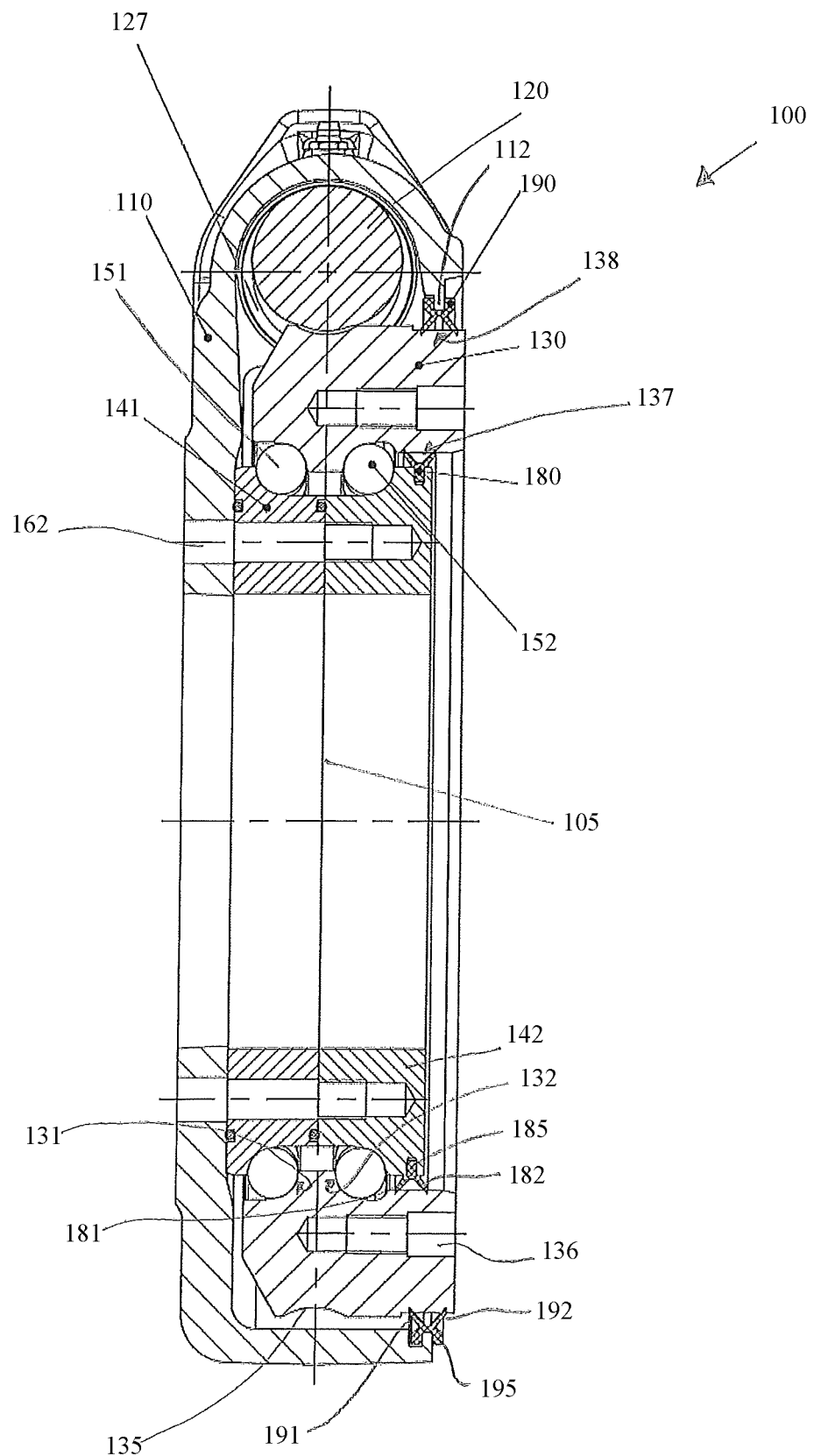
FIG. 1 shows a cross-sectional side view of a gear-driven bearing unit according to the invention.
Figure 2:
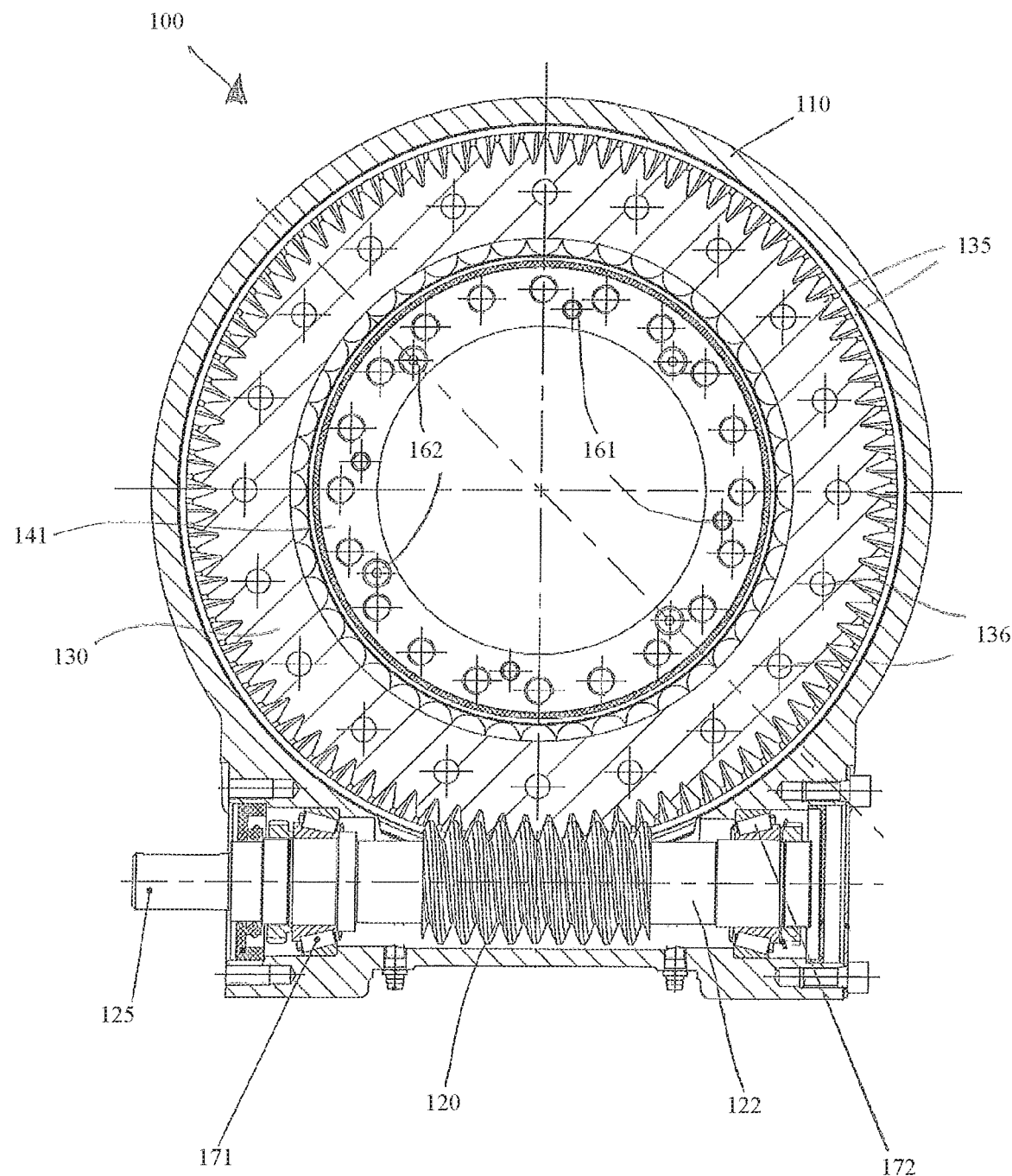
FIG. 2 shows a cross-sectional plan view of the same bearing unit.

An example of a gear-driven bearing unit according to the invention is shown in FIGS. 1 and 2. A common application of such a gear-driven bearing unit is to rotatably support an array of solar panels on a pedestal. The array of panels is attached to a rotatable part of the bearing unit, while a stationary part of the bearing is mounted to the pedestal. Thus, the array of panels can be rotated from east to west as the sun's relative position in the sky changes, ensuring that the panels remain facing towards the sun for optimum electricity generation.

The unit 100 comprises a housing 110, a drive gear 120 and a driven gear, which is supported by a rolling element bearing. In the depicted example, the rolling element bearing is a double-row angular contact bearing. This type of bearing is particularly advantageous as it is able to take up high axial loads and tilting moments which are exerted on the unit by e.g. a solar panel array. Other suitable types of bearing include single and double-row slewing bearings or 4-point contact ball bearings.

For optimal radial compactness, the driven gear also serves as the outer ring of the bearing. Accordingly, a radially outer side of the outer ring 130 is provided with gear teeth 135, and a radially inner side is provided with first and second angular raceways 131, 132. The bearing further comprises a first inner ring 141 and a second inner ring 142, with corresponding inner raceways for a first row 151 and a second row 152 of rolling elements. The first and second inner rings are joined together by means of a plurality of first screw connections 161. The first screw connections also set the initial bearing preload. Additionally, the first and second bearings rings are attached to the housing 110, by means of a plurality of second screw connections 162.

The drive gear 120 in this example is a worm gear that is mounted tangentially to the toothed bearing ring 130. It is also possible to use a spur gear. The drive gear comprises a gear shaft 122 with an input end 125 that is connectible to a motor, for providing the drive. The gear shaft is supported relative to the housing 110 by a first tapered roller bearing 171 and a second tapered roller bearing 172. The worm gear 120 is made of bearing steel and in this example the teeth of the gear are case carburized. In a particularly preferred embodiment, the gear teeth on the drive gear are made of bearing steel and subjected to a hardening treatment that diffuses nitrogen into the gear surfaces.

The housing 110 defines a gear chamber 127 for the drive gear 120, as well as enclosing the outer ring 130 and the first inner ring 141 at a first axial side. Further, the gear chamber 127 is in open connection with a bearing cavity of the double-row angular contact bearing, via an axial gap between the housing and a side face of the outer ring 130. This means that the same lubricant is used to lubricate the gear contacts and the rolling contacts of the double-row angular contact bearing and of the first 171 and second 172 taper roller bearings. A grease lubricant is used, given that grease acts as a barrier for contaminants and is less prone to leakage. A grease is selected that provides good lubrication under high load and at slow rotational speeds. For example, when the unit is employed for solar tracking purposes, the rotational speed typically varies from 0.001 rpm up to 0.01 rpm. According to the invention, a grease comprising calcium is used. An example of a preferred grease is a synthetic mineral oil-based grease with a complex calcium sulphonate thickener, such as "LGWM 2" from SKF. The calcium in the grease reacts with the steel contacting surfaces, to form a protective reaction layer that protects the contacting surfaces from wear and provides low friction over a long period. This will be discussed in more detail further on.

The load to be rotated (e.g. solar panel array) is attached at a second axial side of the unit, via a plurality of mounting holes 136 in the toothed outer ring. To allow for rotation of the outer ring 130, a first radial gap exists between the second inner ring 142 and the outer ring 130 and a second radial gap exists between the outer ring and the housing 110. The unit is therefore provided with a first seal 180 and a second seal 190, for enclosing the first and second gaps respectively and preventing leakage and the ingress of contaminants. In a gear-driven bearing unit according to the invention, the first and second seals comprise two radial sealing lips that bear against a radially oriented counterface. The present inventors have found that this considerably extends the relubrication interval of the unit.

The first seal 180 may be made from an elastomeric polyurethane such as H-ECOPUR® and has a first lip 181 and a second lip 182 which bear against a first radially oriented counterface on a cylindrical inner surface 137 of the toothed outer ring 130. The first lip is predominantly responsible for retaining lubricant within the unit. The second lip 182 excludes contaminants and further shields the first lip 181 from contact with environmental factors, such as sunlight, that would cause aging of the first lip. This helps ensure that the first lip retains optimal sealing function. As shown in FIG. 1, the first lip 181 is preferably angled towards a radial centreline 105 of the unit, while the second lip 182 is angled away from the radial centreline. Thus, internal pressure within the unit acting on the first lip 181 urges this lip towards the counterface 137, which further helps ensure that the first lip 181 retains optimal sealing function. Furthermore, external pressure from outside the unit acting on the second lip 182 will urge this lip towards the counterface 173, thereby enhancing the second lip's ability to exclude contaminants.

The first seal further has a mounting part 185, which in the depicted example is simply a ring of rectangular cross-section. To receive the mounting part 185, the second inner ring 142 is provided with a groove 145 in its radially outer surface. Alternatively, the groove may be provided in the cylindrical inner surface 137 and the first radially oriented counterface may be provided on a cylindrical outer surface of the second inner ring 142. Both the inner ring and the outer ring are made of hardened bearing steel, which is extremely suitable as a counterface for elastomeric lip seals.

The second seal 190 may also be made from an elastomeric polyurethane material and comprises a first radial lip 191, a second radial lip 192 and a mounting part 195. The first and second lips of the second seal 190 bear against a second radially oriented counterface 138, and are angled in the same way as described for the first seal 180. The mounting part 195 of the second seal differs from that of the first seal and has U-shaped cross-section. Thus, the mounting part 195 is adapted to surround a protrusion in a radial surface. In the depicted example, the housing 110 comprises a finger 112 for engagement with the U-shaped cross-section of the mounting part 195. The radial counterface for the second seal is then provided on a cylindrical outer surface 138 of the outer ring 130, which in use of the unit is in sliding contact with the first and second radial lips 191, 192.

The second counterface could also be provided on the housing, but is preferably provided on the toothed outer ring.

As mentioned, the outer ring 130 is made of a bearing-grade steel. The housing is cast from a material such as ductile cast iron, which is less suitable as a counterface. Also, the provision of a cylindrical surface on the housing would require relatively more material than the depicted finger 112.

Thus, it is an advantage of the finger that the housing, at the location of the second seal 190, can be relatively thin. In addition to saving material, this also provides a little more mounting space, which can be important depending on the design of the component that is attached to the outer ring via the mounting holes 136. As will be understood, however, the housing can easily be provided with a groove, such as the groove 145 shown in FIG. 1. The second seal may thus have an attachment part with a rectangular shaped cross-section or a U-shaped cross-section. Similarly, the first seal may have an attachment part with a U-shaped cross-section. With reference to FIG. 1, the groove 145 in the second inner ring 142 would then receive the axially inner part of the U-shaped cross-section.

The gear-driven bearing unit according to the invention is adapted for supporting a compressive load or a suspended load. Especially in the case of a suspended load, when the unit is mounted with a side plate of the housing facing upwards, leakage of lubricant must be prevented. The present inventors have found that by means of first and second seals with two radial lips, leakage is minimized and the relubrication interval for the unit can be extended by many years. In effect, the unit is greased for life.

In addition to being greased for life, maintenance-free operation requires that the grease used is able to provide satisfactory lubrication that prevents wear of the contacting surfaces for the service life of the unit. This is achieved by means of the grease selection in combination with the materials used in the contacting surfaces of the unit.

The unit has two types of contacting surfaces:
the sliding contacts between the gear teeth on the worm drive 120 and the teeth 135 on the outer ring 130; and
the rolling contacts between the rolling elements and the bearing raceways.

The rolling elements 151, 152 and bearing raceways are made of hardened bearing steel. As mentioned, the raceways 131, 132 on the outer member are induction hardened. The inner raceways may also be produced via induction hardening or the inner rings may be through-hardened. According to the invention, the teeth 35 on the outer ring 130 are made of the same bearing steel as the outer raceways 131, 132, but the surface of the teeth is nitrided or undergoes ferritic nitrocarburizing or other treatment which diffuses nitrogen into the surface. The calcium in the grease used according to the invention is thought to initiate a reaction with the steel surfaces, forming a reaction layer that protects the surfaces from wear. When the surface of the teeth on the outer ring has been diffused with nitrogen, the formed reaction layer not only provides wear protection, but also particularly low friction.

Figure 3:
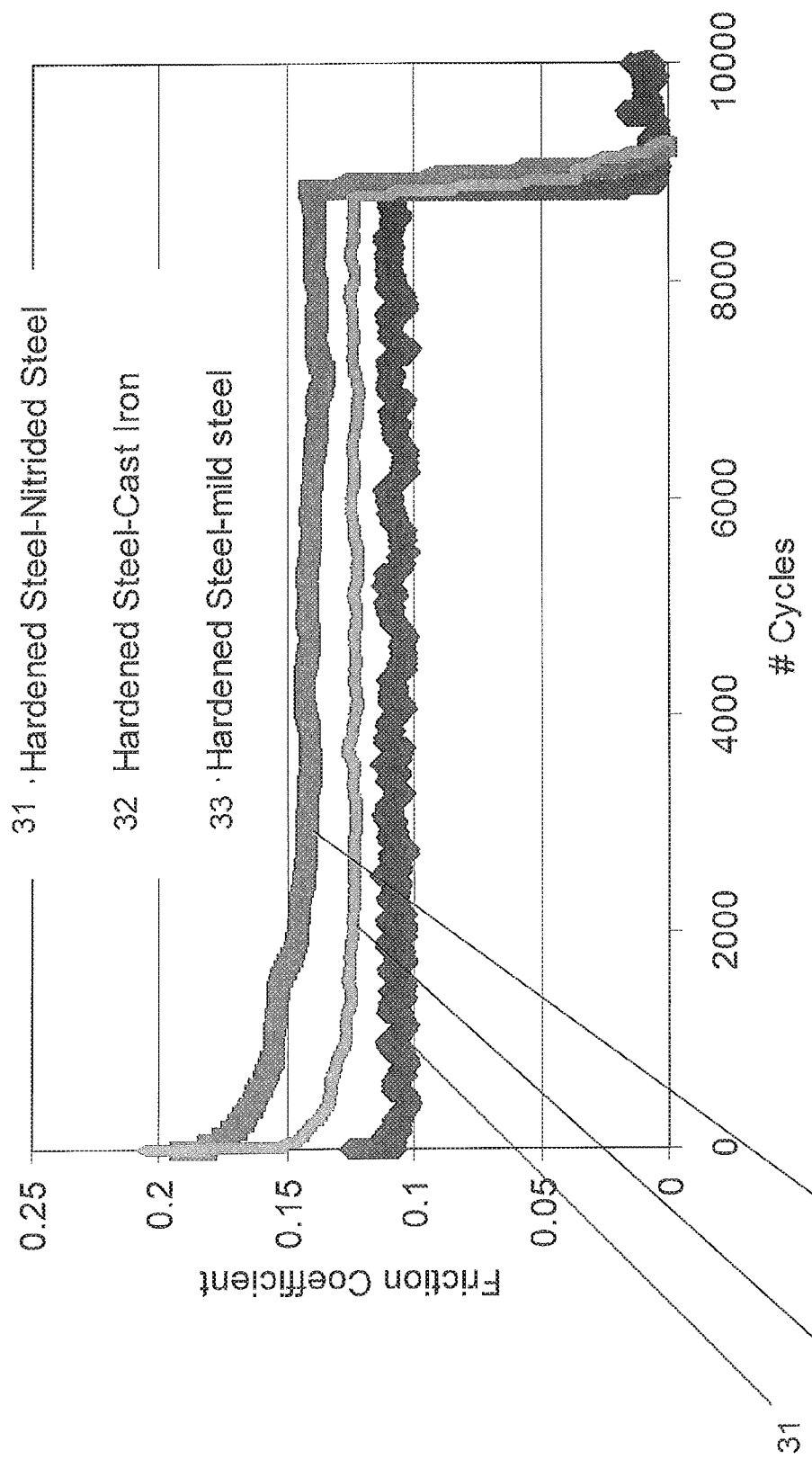
FIG. 3 is a plot of friction test results from three material combinations in sliding contact, lubricated by a Grease A.

This may be seen from the plot in FIG. 3. Using a Cameron-Plint test rig for measuring sliding friction, a hardened steel ball was linearly reciprocated on a plate made from three different materials under the following conditions:
Maximum Herzian contact pressure: 500 MPa
Sliding amplitude: 4 mm;
Frequency: 0.034 Hz;
Lubricant: SKF grease LGWM2, which will be designated as Grease A.

In a first test, the plate was made of nitrided bearing steel according to the invention; in a second test, the plate was made of cast iron; and in a third test, the plate was made of mild steel. The plots of the friction results from the first, second and third tests are respectively shown by lines 31, 32 and 33 in FIG. 3. As may be seen, the test using the plate made of nitrided bearing steel produced the lowest friction. Consequently, the drive gear in a bearing unit according to the invention may also advantageously be made of bearing steel that is subjected to a treatment that diffuses nitrogen into the surface.

A comparison test was conducted using the combination: hardened steel-nitrided steel, under the same conditions described above, but using a different grease, Grease B, which is a grease employed in a commercially available worm drive unit. Grease B does not contain calcium.

Figure 4:
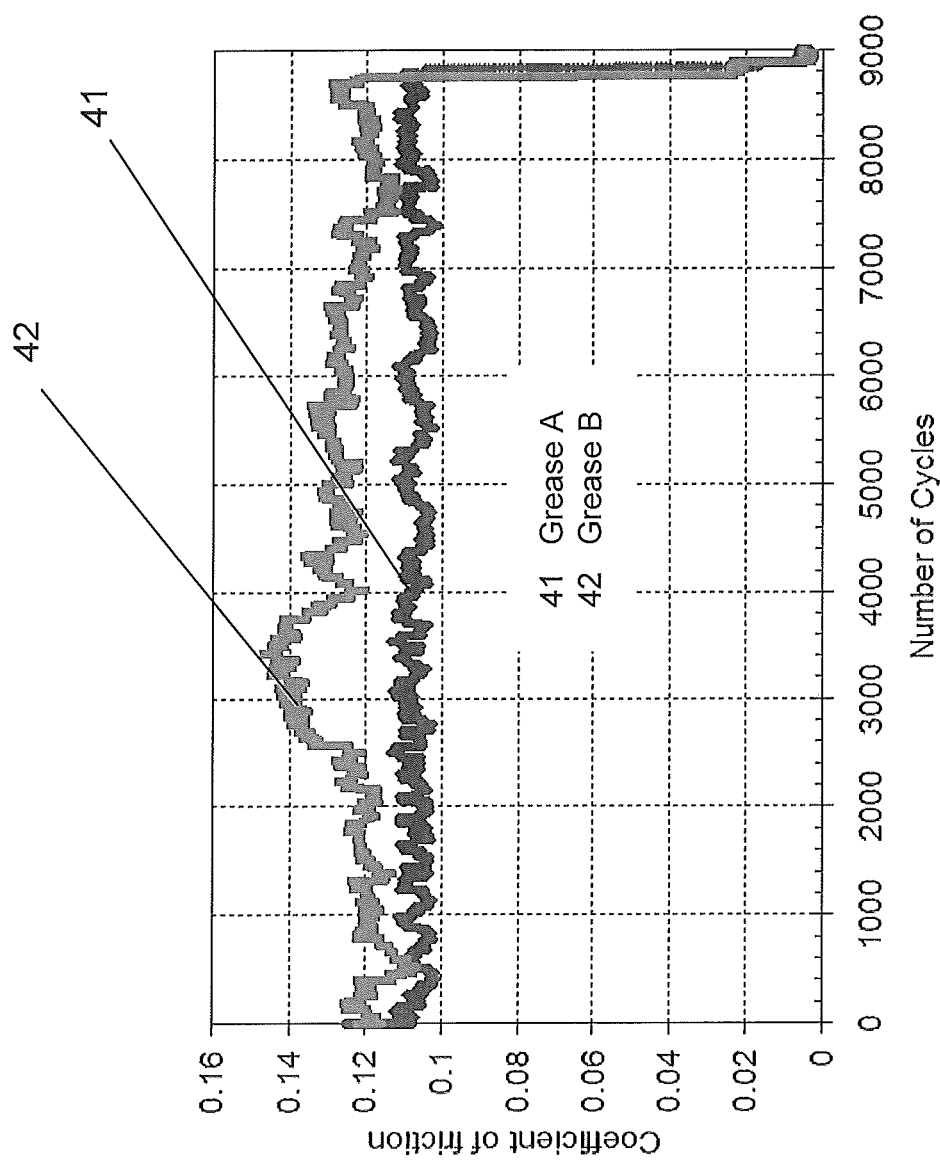
FIG. 4 is a plot of friction test results from hardened bearing steel in sliding contact with nitrided bearing steel, lubricated by Grease A and a Grease B.

In FIG. 4, the results from the first test (using Grease A) are plotted together with the results from the comparison test. As may be seen, Grease A provides a lower and highly stable friction, while Grease B exhibits a higher friction level which increased after approximately 3000 cycles. Furthermore, capacitance was measured during the first test and during the comparison test, using LubCheck equipment from SKF. The capacitance measurement showed that Grease A formed a reaction layer that remained in tact for the duration of the test. Grease B was not able to form a reaction layer and, although the friction was reasonably low, a visible wear track could be observed on the nitrided plate after the test ended.

Grease A and other calcium containing greases also form a good reaction layer on hardened bearing steel. With regard to the rolling contact surfaces of the bearing unit 100, fretting is thought to be the main failure mechanism. The reaction layer also provides wear protection and exhibits low friction under fretting conditions.

The Cameron Plint test rig was used to perform fretting friction tests. A hardened steel ball was linearly reciprocated on a plate made from hardened bearing steel under the following conditions:
Maximum Herzian contact pressure: 6 MPa
Sliding amplitude: 100 microns;
Frequency: 20 Hz;
The following greases were used in the fretting friction tests:
Grease A
Grease B
Grease C: SKF grease "LGHB2" having a complex calcium sulphonate thickener;
Grease D: SKF grease "LGAF 3E", which is a lithium based grease comprising calcium hydroxide additives.

Figure 5B:
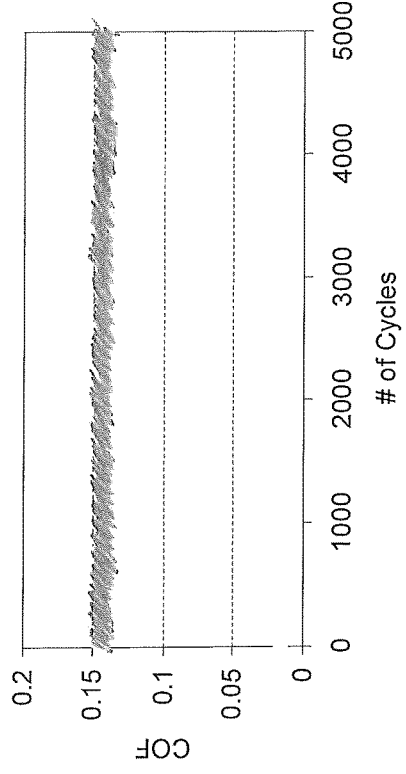
Figure 5C:
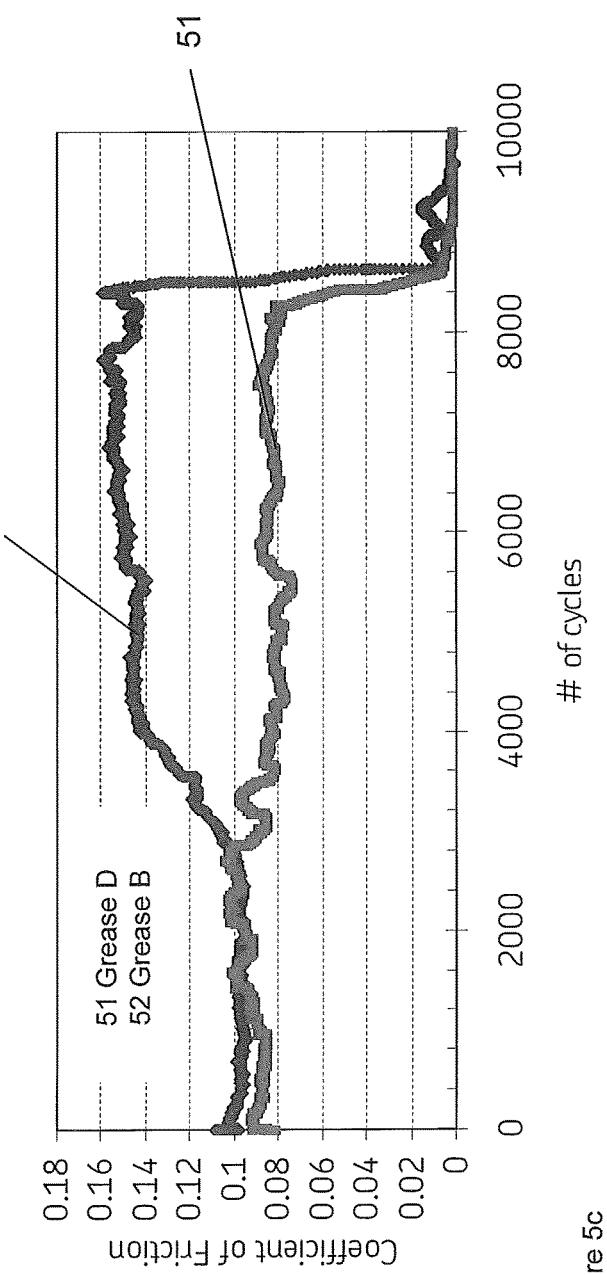

The fretting friction results for Grease A are shown in the plot of FIG. 5a; the results for Grease C are shown in the plot of FIG. 5b and the results for Grease B and Grease D are shown in FIG. 5c.

Grease A, Grease C, and Grease D all exhibit a stable low-friction performance. Furthermore, capacitance measurements using LubCheck also show that each of these greases forms a reaction layer that remains in tact throughout the friction test. Grease B does not form a reaction layer on the hardened bearing steel.

Consequently, the bearing surfaces and the gear surfaces in a unit according to the invention can be protected from wear for the service life of the unit, due to the combination of the grease and materials used. Furthermore, the improved sealing ensures that sufficient grease is always present in the unit, such that the reaction layer can be continuously formed. A gear gear-driven bearing unit according to the invention is thus maintenance free.

A number of aspects/embodiments of the invention have been described. It is to be understood that each aspect/embodiment may be combined with any other aspect/embodiment. The invention may thus be varied within the scope of the accompanying patent claims.

The invention claimed is:

1. A gear-driven bearing unit comprising a housing, a drive gear and a rolling element bearing, the rolling element bearing comprising:
   an outer member provided with teeth for meshing with teeth of the drive gear, an inner member and one or more rows of rolling elements disposed between the inner and outer members, whereby at one axial side of the gear-driven bearing unit
   a first radial gap exists between a radially inner surface of the outer member and a radially outer surface of the inner member; and
   a second radial gap exists between a radially outer surface of the outer member and a radially inner surface of the housing,
   the gear-driven bearing unit being at least partly filled with a grease lubricant, which is retained within the gear-driven bearing unit by a first seal provided in the first radial gap and by a second seal provided in the second radial gap,
   wherein:
   the radially inner surface of the housing comprises a first axially extending surface, a radially extending groove, and a finger having a rectangular-shaped cross-section, the first axially extending surface radially overlaps the one or more rows of rolling elements, the radially extending groove extends radially outwardly from an axial end of the first axially extending surface and is axially delimited by the axial end of the first axially extending surface and the finger, the finger located on an opposite side of the radially extending groove from the axially extending surface such that the finger extends radially inwardly with respect to a bottom surface of the radially extending groove and has a minimum radius greater than a radius of the first axially extending surface,
   one of the first and second seals comprises a first radial lip and a second radial lip that bear against a radially oriented counterface, the first seal comprises a first mounting part that has a rectangular cross-section and is inserted in a groove located in the radially outer surface of the inner member, the second seal comprises a second mounting part that has a U-shaped cross-section, the second mounting part being configured to receive the finger therein such that a portion of the second mounting part is located in the radially extending groove and such that the finger is contacted on each axial side by the second mounting part; and in that
   the grease lubricant comprises a calcium-based thickener or comprises calcium salt additives;
   the teeth of the drive gear are made of a bearing-grade steel; and in that
   the teeth on the outer member are made of a bearing-grade steel that has been subjected to a hardening treatment that diffuses nitrogen into a surface of the teeth.

2. The gear-driven bearing unit according to claim 1, wherein the first radial lip is closer to a radial centreline of the gear-driven bearing unit than the second radial lip, and wherein the first radial lip extends towards the radial centreline and the second radial lip extends away from the radial centreline.

3. The gear-driven bearing unit according to claim 2, wherein an axially outer surface of the second radial lip comprises a thermally reflective material or has a thermally reflective colour.

4. The gear-driven bearing unit according to claim 3, wherein the axially outer surface of the second radial lip is non-smooth, so as to have an increased surface area relative to a smooth surface.

5. The gear-driven bearing unit according to claim 1, wherein the first and second radial lips extend from one of the first mounting part and the second mounting part.

6. The gear-driven bearing unit according to claim 5, wherein the first and second radial lips extend from the second mounting part that has a U-shaped cross-section such that the second mounting part, the first radial lip, and the second radial lip together form an X-shape.

7. The gear-driven bearing unit according to claim 1, wherein the housing comprises a thermally reflective outer surface.

8. The gear-driven bearing unit according to claim 1, wherein the grease lubricant comprises a synthetic mineral oil and a complex calcium suphonate thickener.

9. The gear-driven bearing unit according to claim 1, wherein the teeth provided on the outer member are machined directly into the outer member.

10. The gear-driven bearing unit according to claim 1, wherein the teeth of the drive gear are subjected to a hardening treatment that diffuses nitrogen into a surface of the teeth.

11. The gear-driven bearing unit according to claim 1, wherein the rolling element bearing is a double-row angular contact bearing and the inner member comprises a first inner ring and a second inner ring.

* * * * *